United States Patent [19]

Hennequin

[11] 4,391,527
[45] Jul. 5, 1983

[54] PROCESS AND DEVICE FOR THE POSITIONING OF AN OPTICAL MEASURING INSTRUMENT AND A SPECTACLE FRAME IN RELATION TO EACH OTHER

[75] Inventor: Jean-Claude Hennequin, Neuilly, France

[73] Assignee: Essilor International, Neuilly, France

[21] Appl. No.: 225,035

[22] Filed: Jan. 14, 1981

[30] Foreign Application Priority Data

Jan. 23, 1980 [FR] France ............................. 80 01428

[51] Int. Cl.³ .................... G01B 11/14; A61B 3/00
[52] U.S. Cl. ................................ 356/375; 351/204;
351/245; 356/127
[58] Field of Search ............. 356/375, 399, 401, 127, 356/1, 14; 351/5, 7, 15, 27, 37, 38–39; 33/200; 250/561

[56] References Cited

U.S. PATENT DOCUMENTS 2,087,235 7/1937 Ames, Jr. et al. ................. 351/27
4,212,538 7/1980 Esmond ............................ 356/127

FOREIGN PATENT DOCUMENTS 1772715 8/1970 Fed. Rep. of Germany ......... 351/5
47-18372 1/1972 Japan ................................. 351/7

Primary Examiner—William H. Punter
Attorney, Agent, or Firm—Burgess, Ryan and Wayne

[57] ABSTRACT

The invention concerns a process and device for the positioning of an optical measuring instrument and a spectacle frame in relation to each other. The practitioner, operating from a position roughly determined by the point at which the two optical paths converge adjusts the relative position of the spectacle frame and measuring instrument so that the reflection of the side edge of the frame in a semi-transparent mirror located on each side of the device appears directly over the actual image of an alignment mark behind the mirror. This convergence indicates that the frame is in the correct position in relation to the measuring instrument.

11 Claims, 6 Drawing Figures

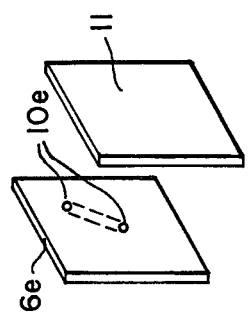
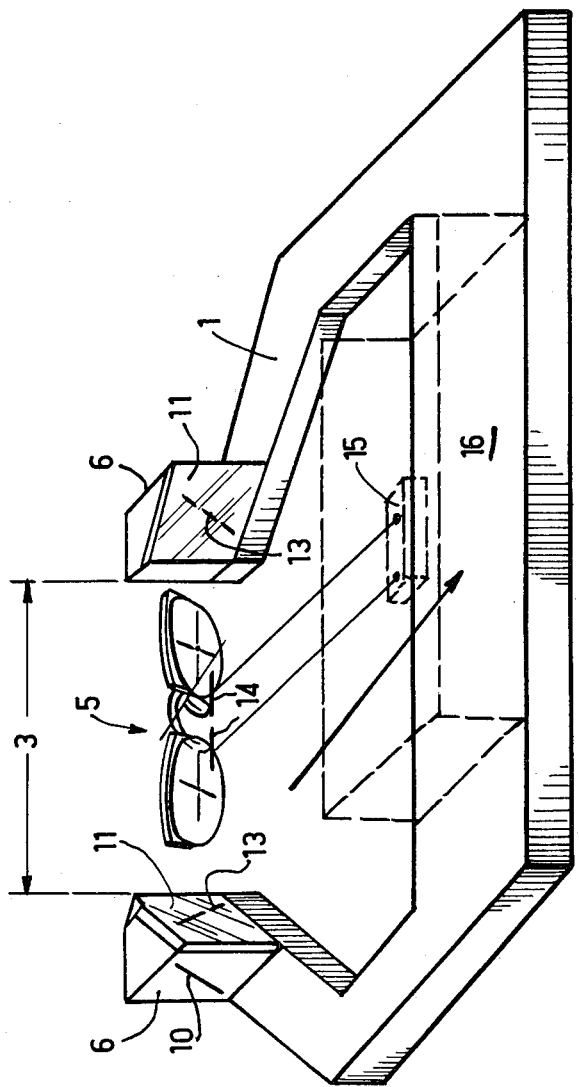

PROCESS AND DEVICE FOR THE POSITIONING OF AN OPTICAL MEASURING INSTRUMENT AND A SPECTACLE FRAME IN RELATION TO EACH OTHER

This invention concerns a process and a device for positioning an optical measuring instrument and a spectacle frame in relation to each other, the principal purpose of such positioning being to define the position of the patient's pupils in relation to the spectacle frame.

More specifically, the invention concerns a process for positioning an optical measuring instrument, comprising a positioning device, and a spectacle frame in relation to each other, this process comprising the location on the device of two separate positioning marks arranged in such as way as to define a reference plane, and the moving of the positioning device and the spectacle frame into a position in which the reference plane and the median plane of the frame are in a predetermined position in relation to each other.

The invention also concerns a positioning device allowing such a process to be practiced, incorporated in an optical measuring instrument, and comprising a stand which contains an opening through which the head of a patient wearing a spectacle frame to be moved in a given position in relation to a reference plane can pass easily, with no risk of injury.

The drawback of processes and devices of this kind is that they do not allow the practitioner to check the position of the frame easily, precisely and reliably, in relation to the positioning device, and consequently in relation to the whole measuring instrument. This is largely because the marks that define the positioning plane of the spectacle frame consist of two lines, one on each of two transparent plates on each side of the opening through which the patient's head passes, so that the practitioner has to ensure, by observing from both sides of the device, that the side outline of the frame matches up on each side with the adjacent positioning line. This method leads to inaccuracies, and therefore the possibility of error, particularly parallax, whether the practitioner observes both sides of the frame outline directly and in turn, and their position in relation to the respective positioning lines, or whether he performs this operation by using one or more reflecting mirrors placed near the positioning-mark plates. This second method is described in French patent application No. 2,014,200, but the separation of the positioning marks from the semi-reflecting mirrors for lateral observation of the frame rules out perfect binocular observation.

The present invention aims to overcome the drawbacks and disadvantages of existing processes and devices, by describing means of positioning the frame in relation to the measuring instrument, simply, accurately and reliably.

This new process is characterized by the fact that a semi-transparent mirror is placed between the frame and each of the positioning marks, each such mirror, separated from the other mirror, being placed symmetrically in relation to a median plane of symmetry at right angles to the reference plane, and forming a plane bisecting the angle formed by the mirrors, that the positioning marks are observed from a point on this bisecting plane, and that the device and the frame are moved in relation to each other until the reflection of the side outline of the frame in each of the mirrors coincides with the relevant positioning marks visible through each mirror.

The device to perform this new process is characterized by the fact that the reference plane is defined by two lines, one on each of two flat surfaces consisting of two positioning-mark plates facing each other across the opening, symmetrically positioned in relation to a median symmetry plane at right angles to the reference plane, and that on each side of the opening there is a semi-transparent mirror between the median plane and one of the positioning-mark plates, symmetrically placed in relation to the symmetry plane and in relation to the positioning-mark plates, in such a way that, for an observer at a given point in this symmetry plane, each positioning mark seen through the appropriate semi-transparent mirror coincides with the side outline of the frame reflected in the said mirror, when the frame is positioned in relation to the reference plane.

The positioning device of the present invention is used in cooperation with an optical measuring instrument or photographic apparatus for determining the position of a patients pupils in relation to the spectacle frame.

This invention allows the practitioner to check the positioning of the frame in relation to the positioning marks from a single point while observing the spectacle frame straight on. When such a procedure and device are used in the way described here, the possibility of error, particularly arising from parallax, is practically ruled out.

The following description, and accompanying illustrations, of one possible embodiment of this invention will demonstrate other functions and benefits.

FIG. 1 is a view in perspective of one version of the new positioning device.

FIGS. 3, 4, 5 and 6 show a particular embodiment of the positioning marks.

Figure 2:
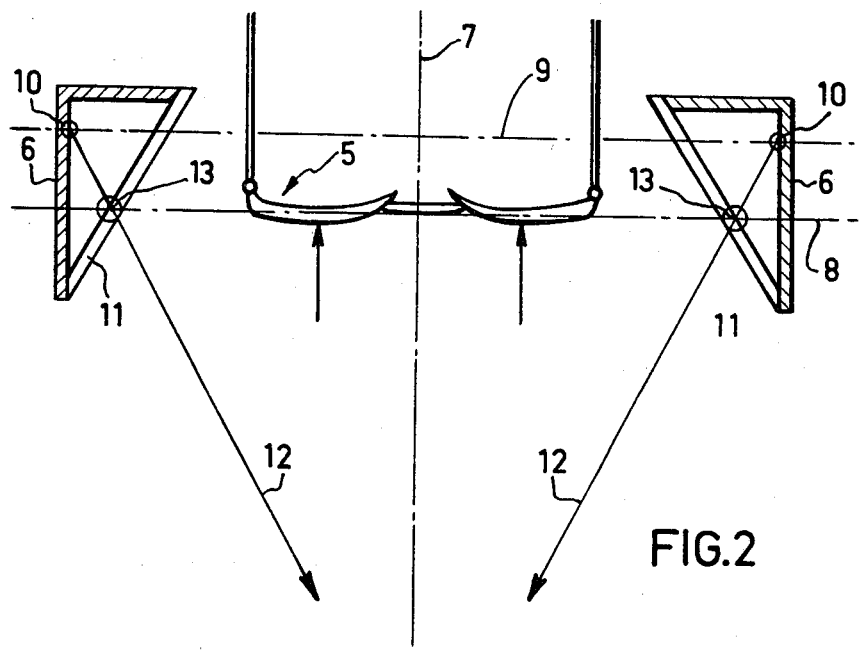
FIG. 2 is a simplified cross-sectional view showing the main parts of the positioning device illustrated in FIG. 1, and the path of the light beams, seen from above.

The positioning device such as shown in FIG. 1 forms part of an optical measuring instrument 16, and comprises a horizontal stand 1, which can be adjusted in height and along three spatial geometrical axes, and which contains an opening 3, wide enough for the head of a patient wearing a spectacle frame intended to be positioned in relation to the instrument 16.

On each side of the opening there is a positioning-mark plate 6. These are angled symmetrically in relation to the vertical median plane of symmetry 7 (shown in FIG. 2) which is at right angles to the mean plane 8 of the frame 5 when the frame is positioned correctly, and also at right angles to a reference plane 9, defined by positioning lines 10, each of which is a segment of a straight line forming part of the plane of reference. At least one of these lines 10 may be replaced by at least two dots on the same straight line.

Each plate 6 is combined with a flat semi-transparent mirror 11, angled in relation to the plate on a vertical axis, as illustrated in FIG. 2.

The practitioner, operating from a position roughly determined by the point at which the two optical paths 12 converge, adjusts the relative position of the frame 5 and measuring instrument 16 (more specifically the positioning device which forms part of this instrument) so that the reflection of the side edge of the frame in the semitransparent mirror 11 on each side of the device is located directly over the actual image of the relevant mark 10. This convergence indicates that the frame is in the correct position in relation to the measuring instrument.

In one recommended embodiment, the device comprises a system 15 to project symmetrical light beams on to the frame 5, thereby making the positioning operation easier and more accurate, by allowing the practitioner to use these beams to adjust and check the frame position more precisely, so that the straight line between the centres of the lens apertures bounded by the spectacle frame is at right angles to the median plane of symmetry 7.

Under certain circumstances, the practitioner can also observe the reflections of the light beams 14 in the semi-transparent mirrors 11 and if necessary make the adjustments required to make these reflections, which are positioned symmetrically to the symmetry plane 7, coincide on each mirror with each other, for an observer positioned at the observation point defined above. This allows the practitioner to check and make adjustments easily to the final positioning of the frame 5 round the three spatial geometrical axes, in relation to the optical instrument to which the positioning device is attached.

Figure 3:
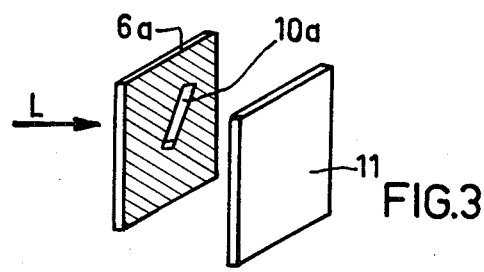

In the embodiment illustrated in FIG. 3, the positioning marks 10 each consist of a transparent slit 10a in a transparent plate 6a, with a semi-transparent mirror 11, as described above, illuminated from outside, along the arrow L.

Figure 4:
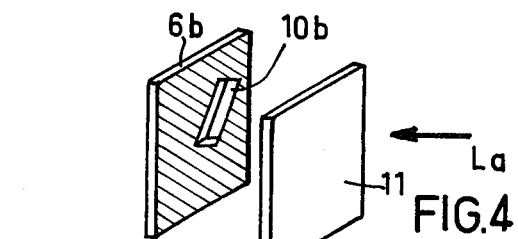

In the embodiment illustrated in FIG. 4, the positioning mark plate 6b is opaque, with a phosphorescent line 10b as positioning mark, illuminated through the semi-transparent mirror 11, along the arrow La.

Figure 5:
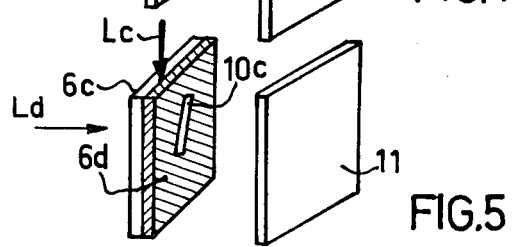

In the embodiment illustrated in FIG. 5, the positioning mark plate 6c is transparent, and the side facing the semi-transparent mirror 11 is covered by an opaque sheet 6d containing a slit 10c which acts as positioning mark; the plate 6c is illuminated by a light beam Lc on one of its edges or light beam Ld striking its surface.

In the embodiment illustrated in FIG. 6, the positioning mark 10e in opaque plate 6e is shown as two dots on a line which corresponds to the positioning mark. The outline of the full corresponding positioning mark is shown as a dotted line. The positioning marks in the other embodiments can have the dot configuration illustrated in FIG. 6.

Naturally, this invention is in no way confined to the embodiments described and illustrated above: many variations are possible for someone skilled in the art, depending on the applications involved and without any departure from the spirit of the invention.

What is claimed is:

1. A process for positioning an optical measuring instrument comprising a positioning device and a spectacle frame in relation to each other, wherein two positioning marks on the device are arranged in such a way as to define a reference plane, and that the positioning device and spectacle frame are moved into a position in which the reference plane and mean plane of the frame are in a given position in relation to each other, and by the fact that a semi-transparent mirror is placed between the frame and each of the positioning marks, each such mirror, separated from the other mirror, being placed symmetrically in relation to a median plane of symmetry at right angles to the reference plane, and forming a plane bisecting the angle formed by the mirrors, and by the fact that the positioning marks are observed from a point on this bisecting plane, and that the device and frame are moved in relation to each other until the reflection of the side outline of the frame in each of the mirrors coincides with the relevant positioning mark visible through each mirror.

2. A process as defined in claim 1, wherein two symmetrical light beams are projected on to the spectacle frame, allowing the positions of frame and positioning device to be checked and/or adjusted more precisely in relation to each other, so that a straight line on the mean plane between the centres of the lens apertures formed by the spectacle frame, is at right angles to the median plane of symmetry.

3. A process as defined in claim 2, wherein the reflections of the light beams in the semi-transparent mirrors are observed, and the positions of the frame and positioning device in relation to each other are adjusted until these images coincide with each other on each semi-transparent mirror.

4. A positioning device to perform the process defined in claim 1, comprising a stand which contains an opening to take a spectacle frame to be moved into a given position in relation to a reference plane, this device being characterized by the fact that the reference plane is defined by two lines, one on each of two flat surfaces consisting of two positioning-mark plates facing each other across the opening, and that on each side of the opening the semi-transparent mirror is placed between the median plane and one of the positioning-mark plates, symmetrically placed in relation to the plane of symmetry and in relation to the positioning-mark plates, in such a way that, for an observer at a given point in this symmetry plane, each positioning mark seen through the appropriate semi-transparent mirror coincides with the side outline of the frame reflected in the said mirror, when the frame is positioned in relation to the reference plane.

5. A device as defined in claim 4, wherein each positioning mark comprises a transparent slit in an opaque positioning-mark plate, and each such mark is illuminated by a light source located on the side of the plate opposite the accompanying semi-transparent mirror.

6. A device as defined in claim 4, wherein each positioning mark comprises a phosphorescent line on the side of the positioning mark plate facing the accompanying semi-transparent mirror, and each such mark is illuminated through the semi-transparent mirror.

7. A device as defined in claim 4, wherein each positioning mark consists of a slit in an opaque sheet placed on the positioning-mark plate, facing the accompanying semi-transparent mirror.

8. A device as defined in claim 7, wherein the positioning mark plate is illuminated by a light beam striking the surface of the said plate, opposite the semi-transparent mirror.

9. A device as defined in claim 7, wherein at least one of the edges of the positioning-mark plate is illuminated by a light beam, for the purposes of illuminating the said plate.

10. A device as defined in claim 4, wherein at least one of the positioning lines is replaced by at least two dots on a straight line corresponding to the said positioning line.

11. A device as defined in claim 4, comprising means of projecting symmetrical positioning light beams on to the frame, on each side of the median plane of symmetry.

* * * * *